United States Patent [19]

Magretta et al.

[11] Patent Number: 4,790,707

[45] Date of Patent: Dec. 13, 1988

[54] MODULAR PARTS SUPPLY RACK

[75] Inventors: Eugene Magretta, Redford Township, Wayne County, Mich.; Steven A. Read, Pickering, Canada

[73] Assignee: Chrysler Motors Corporation, Highland Park, Mich.

[21] Appl. No.: 168,023

[22] Filed: Mar. 14, 1988

[51] Int. Cl.[4] .............................................. B65G 1/08
[52] U.S. Cl. ..................................... 414/276; 211/187
[58] Field of Search ...................... 414/276, 267, 266; 211/59.2, 59.4, 191, 192, 187; 312/17, 59, 60, 35

[56] References Cited

U.S. PATENT DOCUMENTS

| 1,711,329 | 7/1926 | Short ................................... 211/59.2 |
| 2,228,775 | 7/1988 | Morgan ............................... 211/59.2 |
| 2,443,871 | 6/1945 | Shield ................................. 211/59.2 |
| 3,499,539 | 3/1970 | Fisher ................................. 211/59.2 |
| 4,270,661 | 6/1981 | Rosenband ......................... 211/59.2 |

FOREIGN PATENT DOCUMENTS 1141231 12/1962 Fed. Rep. of Germany ...... 414/276
43097 6/1970 Finland ............................. 211/59.2

Primary Examiner—Leslie J. Paperner
Assistant Examiner—G. Cundiff
Attorney, Agent, or Firm—Edward A. Craig

[57] ABSTRACT

A modular parts supply rack is provided for supplying a plurality of containers filled with small parts from a loading end to a delivery end for use by vehicle assembly line operators and for return of empty nested containers from the delivery end to the loading end. The rack comprises a pair of upstanding spaced apart side walls which are connected together by a plurality of detachably mounted support bars. A plurality of side-by-side slide members extend between pairs of support bars and are detachably secured thereto.

5 Claims, 4 Drawing Sheets

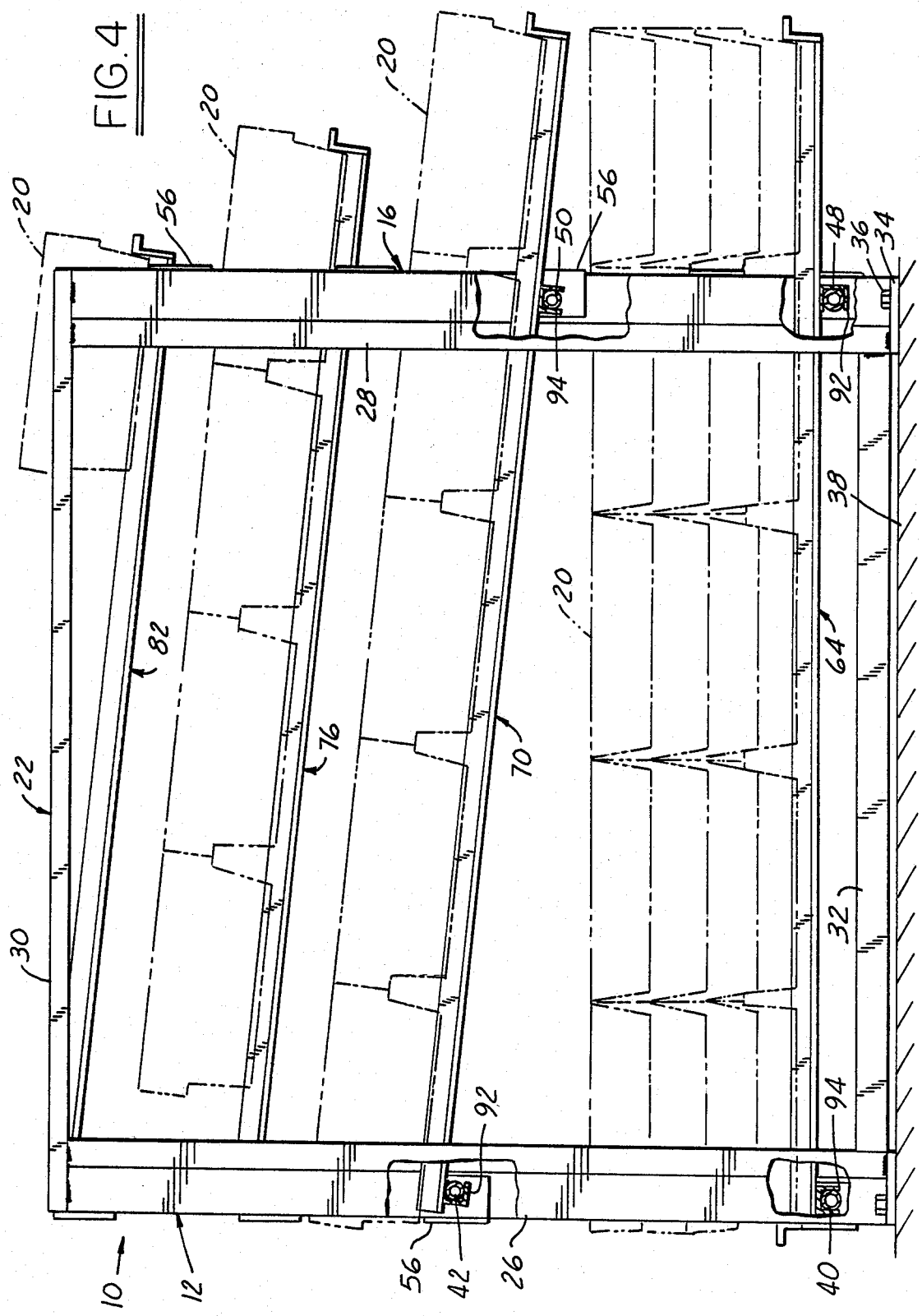

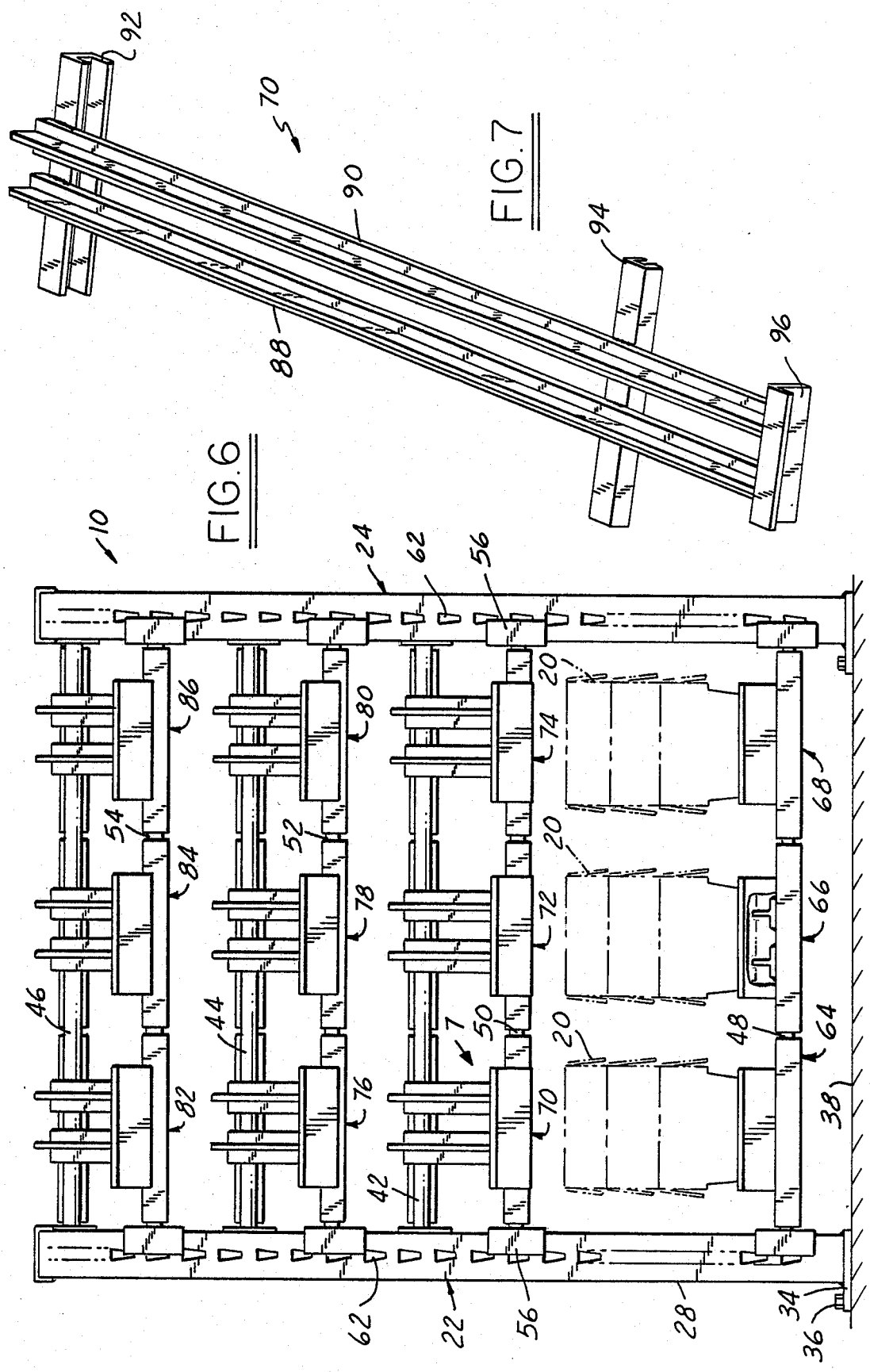

MODULAR PARTS SUPPLY RACK

BACKGROUND OF THE INVENTION

1. Field of the Invention

A modular parts supply rack is provided for supplying a plurality of containers filled with small parts from a loading end to a delivery end for use by vehicle assembly line operators.

2. Prior Art

Many small parts are used in the assembly of cars and trucks. The small parts are such things as fasteners (screws, bolts, screw nails, etc.), mechanical parts used in the construction of vehicles, and the like. These parts are supplied to assembly line operators at assembly work stations. They are normally provided in boxes or like containers. The provision of containers of small parts at an assembly line work station is referred to as "line feed". The term "line feed" refers to an operator removing production parts from a container at his work station and assembling the parts to a moving flow of vehicles or vehicle sub-assemblies.

In the past, many different containers have been used for small parts. The containers have had various shapes and sizes which has proved to be a productivity draw back. A container has been developed recently by Automotive Industry Action Group. This container design is an attempt to provide a common container for all small parts. The container is fabricated of a tough plastic and has a size and shape which is desirable for the intended function. The container has dimensions of approximately fifteen inches long, by eight inches wide by eight inches high. It has a two-flap lid with each flap being hinged on one side to enclose the contents of the container. The bottom of the container is provided with two longitudinal grooves approximately one-half inch wide by one-quarter inch deep. These two grooves are utilized in the present invention to guide the container along T-shaped rails. The intent of the container is to provide a standard small parts package which is usable by automotive manufacturers and small parts manufacturers. The rack of the present invention provides the production operator with nine lanes of filled containers and three lanes for return of empty containers. This is all done at one work station. A mix of one through nine part numbers is thus available to the operator.

SUMMARY OF THE INVENTION

A modular parts supply rack is provided for supplying a plurality of containers filled with small parts from a loading end to a delivery end for use by vehicle assembly line operators and for return of empty nested containers from the delivery end to the loading end. The rack includes a pair of upstanding spaced apart side walls each having a loading end and a delivery end. At least three vertically spaced apart loading end support bars extend between the loading ends of the side walls. Similarly, at least three delivery end support bars extend between the delivery ends of the side walls. Detachable fastening means secure each end of each support bar to its respective side wall.

Each loading end support bar is paired with the delivery end support bar occupying the same vertical sequential position. The lowermost loading end support bar is at substantially the same vertical level as the lowermost delivery end support bar. The loading end support bar of each of the remaining pairs of support bars is at a higher vertical level than its paired delivery end support bar. The lowermost loading end support bar and the delivery end support bars of the remaining pairs have a generally circular cross-section.

A plurality of side-by-side slide members extend between each set of support bars. The lowermost slide members extend substantially horizontally for manual return of empty nested containers from the delivery end to the loading end. The remaining slide members are angled downwardly from the loading end support bars to the delivery end support bars for gravity feed of filled containers from the loading end to the delivery end.

Each slide member includes a generally C-shaped mounting bracket structure at each end thereof in detachable engagement with the paired support bars between which the slide member extends. Each C-shaped bracket structure has an open mouth. The mouth of the C-shaped bracket structure engaging the support bars which have a generally circular cross-section faces towards the opposite end of the rack with said bracket received on said support bar. The mouth of the other C-shaped bracket structure faces downwardly with the bracket received on the other support bar of the pair.

With this construction, the slide members each are mountable on a pair of support bars by hooking the C-shaped bracket structure having its mouth facing towards the opposite end of the rack onto the support bar having a generally circular cross-section with the other C-shaped bracket positioned above the other support bar of the pair. The slide member is then pivoted downwardly using the hooked support bar as a pivot to engage the other C-shaped bracket with the other support bar of the pair.

Preferably, the delivery ends of the upper slide members are horizontally staggered with the lower slide member extending further in the horizontal direction than the slide members thereabove to provide for easy access to the contents of containers at the delivery end of the rack. Further, preferably all of the support bars have a generally circular cross-section and four pairs of support bars are provided. The uppermost delivery end support bar is preferably at a height of about four feet to provide for ready access to the contents of the containers at the delivery end of the rack. The inclined slide members are preferably at an angle of about fifteen degrees to the horizontal plane to conserve vertical space while at the same time providing for adequate gravity feed of containers.

IN THE DRAWINGS:

FIG. 4 is a side-elevational view of the rack of FIG. 1;

FIG. 6 is a front elevational view of the rack of FIG. 1, and

FIG. 7 is a view of a slide member in perspective taken in the direction of the arrow labeled 7 in FIG. 6.

DETAILED DESCRIPTION OF A PREFERRED EMBODIMENT

Figure 1:
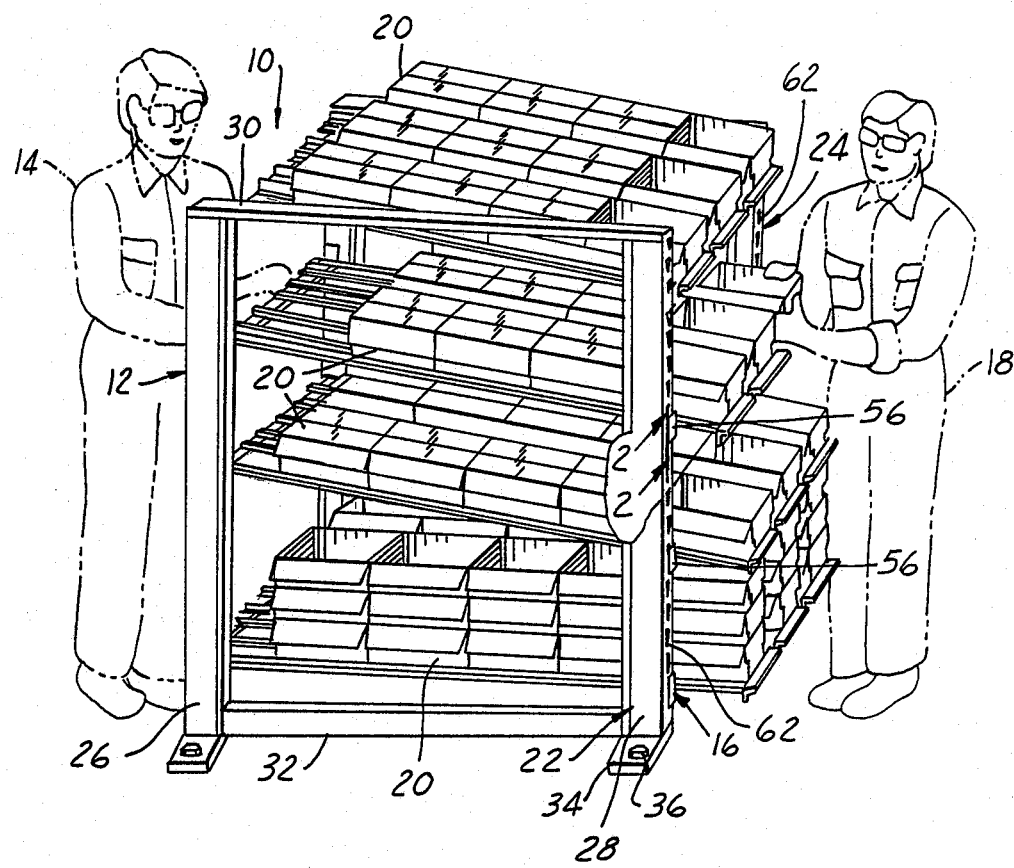
FIG. 1 is a view in perspective of a modular parts supply rack forming one embodiment of the present invention.

As will be noted in the figures, the modular parts supply rack 10 includes a loading end 12, which as shown in FIG. 1 is attended by a loading operator 14, and a delivery end 16 which, again is shown in FIG. 1, is attended by an assembly operator 18. The loading operator 14 loads containers 20 filled with small parts onto the upper slide members of the rack and takes away empty containers 20 which are nested together and stored on the lowermost slide members of the rack. The assembly operator 14 or 18 opens the filled containers and operator 18 uses parts therefrom for production purposes as necessary. As will be noted, there are nine lanes of filled containers thus enabling the operator to be provided with up to nine different parts at the work station. Obviously, more than one assembly operator may take parts from the same work station.

The rack 10 includes a pair of upstanding spaced apart side walls 22, 24. Each side wall has a loading end and a delivery end as above-described. Each side wall member includes a pair of spaced-apart upstanding posts 26, 28 connected together at their upper and lower ends by means of rails 30, 32 which are welded thereto to form a sturdy construction. A flange 34 is provided at the lower end of each post with an opening therein for the insertion of a bolt 36 to firmly secure the side walls to the floor structure 38.

Figure 3:
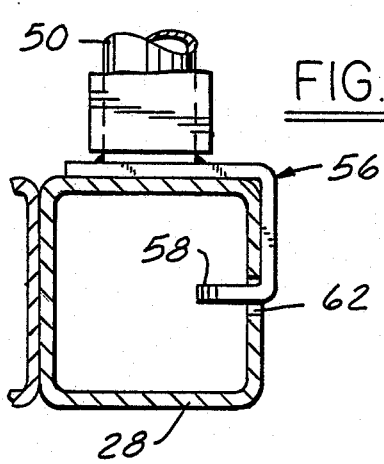
FIG. 3 is a sectional view taken substantially along the line 3—3 of FIG. 2 looking in the direction of the arrows.
Figure 2:
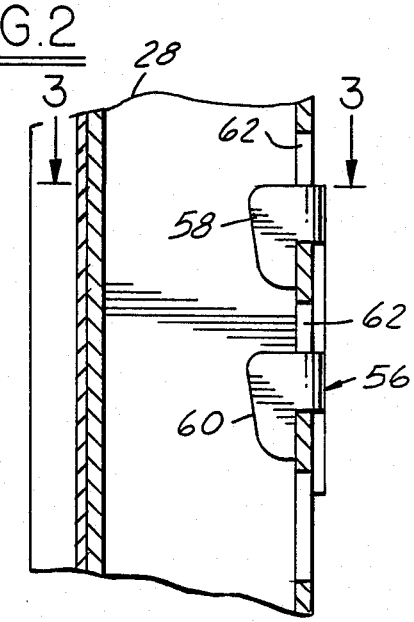
FIG. 2 is a sectional view taken substantially along the line 2—2 of FIG. 1 looking in the direction of the arrows.
Figure 5:
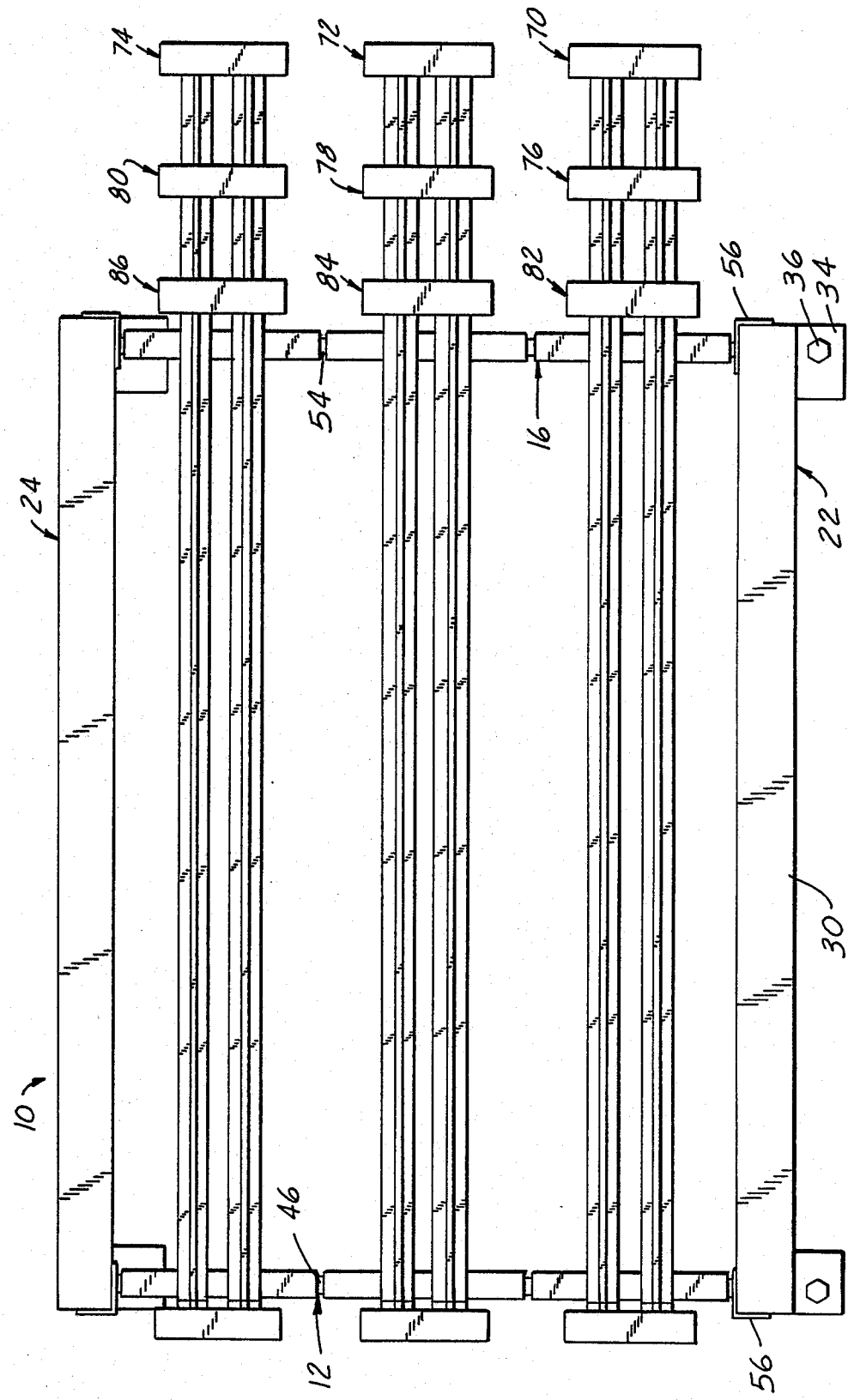
FIG. 5 is a top plan view of the rack of FIG. 1.

Four vertically spaced apart loading end support bars 40, 42, 44, 46 extend between the loading ends of the side walls 22, 24. Four paired vertically spaced apart delivery end support bars 48, 50, 52, 54 extend between the delivery ends of the side walls 22, 24. The support bars are secured in place by means of detachable fastening means in the form of a L-shaped bracket 56 having a pair of hook-like fingers 58, 60 as shown in FIGS. 2 and 3. A bracket 56 is secured to each end of each support bar as by welding. The bracket is received on the upstanding posts of the side walls with the fingers 58, 60 extending into a pair of the vertically spaced apart slots 62 provided in the outer face of each of the posts 26, 28 of the side walls. The support bars thus form with the side walls a sturdy box-like structure. The support bars have a generally circular cross-section for easy attachment of slide members as will be described.

The lowermost loading end support bar 40 is at substantially the same vertical level as the lowermost delivery end support bar 48. The loading end support bars 42, 44, 46 of each of the remaining pairs of support bars is at a higher vertical level than its paired delivery end support bar 50, 52, 54.

Twelve side-by-side slide members 64, 66, 68, 70, 72, 74, 76, 78, 80, 82, 84, 86 extend between each set of paired support bars. The lowermost slide members 64, 66, 68 extend substantially horizontally for manual return of empty nested containers 20 from the delivery end 16 to the loading end 12. The assembly operator 18 merely nests three empty boxes together and pushes them onto one of the slide members 64, 66, 68, thus pushing the whole row back toward the loading end. This permits the loading end operator 14 to retrieve the empty containers and take them away for further use.

The remaining slide members are angled downwardly from the loading end support bars to the delivery end support bars for gravity feed of filled containers 20 from the loading end 12 to the delivery end 16. These slide members are at an angle of about fifteen degrees to the horizontal plane to conserve vertical space while at the same time providing for adequate gravity feed of filled containers.

As will be noted in FIG. 7, each slide member comprises a pair of T-shaped rails 88, 90 which are secured to generally C-shaped mounting bracket structures 92, 94 as by welding. An L-shaped stop member 96 is provided at one end of each slide member to limit movement of containers. The C-shaped mounting brackets are for detachable engagement with the paired support bars between which each slide member extends. Each C-shaped bracket structure has an open mouth. The mouth of one C-shaped bracket structure 92 faces toward the opposite end of the rack when the bracket is received on a support bar. As will be noted in FIG. 4, this bracket structure is provided at the loading end with respect to the upper slide members and at the delivery end with respect to the lowermost slide members. The reason for this is that this bracket member 92 functions to lock the slide member horizontally and is provided at the end where containers 20 will be pushed or slid to thus prevent disengagement of the bracket from the support bar. The mouth of the other C-shaped bracket 94 faces downwardly, with said bracket being received on the other support bar of each pair.

This construction permits easy mounting of the slide members onto the support bars. When mounting a slide member, the bracket 92 is first hooked onto its support bar with the other bracket structure 94 positioned above the other support bar of the pair. The slide member is then pivoted downwardly using the support bar hooked by bracket 92 as a pivot until the other C-shaped bracket 94 engages the other support bar of the pair. It is important that the support member hooked by the C-shaped bracket 92 have a generally circular cross-section so that it may serve as a pivot point. However, it is also desirable that all of the support bars have a circular cross-section for easy mounting of both types of brackets.

We claim:

1. A modular parts supply rack for supplying a plurality of containers filled with small parts from a loading end to a delivery end for use by vehicle assembly line operators and for return of empty nested containers from the delivery end to the loading end, the rack comprising a pair of upstanding spaced apart side walls each having a loading end and a delivery end, at least three vertically spaced apart loading end support bars extending between said loading ends of the side walls, at least three delivery end support bars extending between said delivery ends of the side walls, detachable fastening means securing each end of each support bar to its respective side wall, each loading end support bar being paired with the delivery end support bar occupying the same vertical sequential position, the lowermost loading end support bar being at substantially the same vertical level as the lowermost delivery end support bar, the loading end support bar of each of the remaining pairs of support bars being at a higher vertical level than its paired delivery end support bar, the lowermost loading end support bar and the delivery end support bars of said remaining pairs having a generally circular cross-section, a plurality of side-by-side slide members extending between each set of paired support bars, the lowermost slide members extending substantially horizontally for manual return of empty nested containers from the delivery end to the loading end, the remaining slide members being angled downwardly from the loading end support bars to the delivery end support bars for gravity feed of filled containers from the loading end to the delivery end, each slide member including a generally C-shaped mounting bracket structure at each end thereof in detachable engagement with the paired support bars between which the slide member extends, each C-shaped bracket structure having an open mouth, the mouth of the C-shaped bracket structure engaging the support bars which have a generally circular cross-section facing towards the opposite end of the rack with said bracket received on said support bar, the mouth of the other C-shaped bracket structure facing downwardly with said bracket received on the other support bar of the pair, whereby the slide members each are mountable on a pair of support bars by first hooking the C-shaped bracket structure having its mouth facing towards the opposite end of the rack onto the support bar having a generally circular cross-section with the other C-shaped bracket positioned above the other support bar of the pair and then pivoting the slide member downwardly using said hooked support bar as a pivot to engage the other C-shaped bracket with the other support bar of the pair.

2. A modular supply rack as in claim 1, further characterized in that the delivery ends of said remaining slide members are horizontally staggered with a lower slide member extending further in the horizontal direction than the slide members thereabove to provide for easy access to the contents of containers at the delivery end of the rack.

3. A modular supply rack as in claim 1, further characterized in that all of the support bars have a generally circular cross-section.

4. A modular supply rack as in claim 1, further characterized in that four pairs of support bars are provided, the uppermost delivery end support bar being at a height of about four feet to provide for ready access to the contents of containers at the delivery end of the rack.

5. A modular supply rack as in claim 1, further characterized in that said remaining slide members are at an angle of about fifteen degrees to the horizontal plane to conserve vertical space while at the same time providing for adequate gravity feed of containers.

* * * * *